(12) United States Patent
Sivertsen

(10) Patent No.: US 9,897,250 B1
(45) Date of Patent: Feb. 20, 2018

(54) WALL MOUNT SYSTEM WITH BRACKETS COUPLED TO WALL PLATE TRACK BY ROTATABLE SECUREMENT DEVICE

(71) Applicant: American Megatrends, Inc., Norcross, GA (US)

(72) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 14/175,618

(22) Filed: Feb. 7, 2014

(51) Int. Cl.
| F16M 11/00 | (2006.01) |
| F16M 13/02 | (2006.01) |
| F16M 11/04 | (2006.01) |
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |
| A47F 5/00 | (2006.01) |

(Continued)

(52) U.S. Cl.
CPC .......... *F16M 13/02* (2013.01); *F16M 11/041* (2013.01); *A47B 96/06* (2013.01); *A47G 29/00* (2013.01); *E04G 3/00* (2013.01); *F16M 11/10* (2013.01); *F16M 2200/024* (2013.01); *F21V 21/00* (2013.01); *F21V 35/00* (2013.01); *G06F 1/1601* (2013.01)

(58) Field of Classification Search
CPC .......... A47B 96/00; A47B 96/06; A47G 1/16; A47G 1/24; A47G 29/00; E04G 3/00; E04G 5/06; H04N 5/64; H04N 5/655; Y10T 292/0937; Y10T 292/0959; Y10T 292/1063; E05B 15/0093; Y10S 292/46; Y10S 292/30; F16M 11/10; F16M 11/18; F16M 13/02; F16M 13/022; F16M 11/04; F16M 11/041; E05L 315/0093; A47K 1/00; F21V 21/00; F21V 35/00
USPC .. 248/690, 693, 447.1, 450, 220.21, 220.22, 248/221.11, 222.11, 222.13, 223.41, 248/292.14, 294.1, 298.1; 292/194, 195, 292/198, 200, DIG. 42, 95, 130, 135, 134, 292/184, 230, 235, 236, 237
See application file for complete search history.

(56) References Cited

U.S. PATENT DOCUMENTS 3,019,043 A * 1/1962 Woodworth et al. .......... 292/113
3,124,378 A * 3/1964 Jackson ........................... 292/5

(Continued)

*Primary Examiner* — Leslie A Nicholson, III
*Assistant Examiner* — Taylor L Morris
(74) *Attorney, Agent, or Firm* — Newport IP, LLC | Shigeta & Hope

(57) ABSTRACT

A wall mount system is disclosed. The wall mount system can include a wall plate and one or more brackets. To secure a display to a wall, the brackets are affixed to the display and the wall plate is affixed to the wall. The brackets can include one or more lips couplable to tracks of the wall plate. The brackets further include a rotatable securement device having a lip couplable to the bottom track of the wall plate. The securement device can be manipulated using a lever that has one end rotatably coupled to the securement device and one end distal from the securement device. The distal end extends to a position proximate to the bottom rear of a display. When manipulated in a direction towards the securement device, the lever rotates and decouples the securement device.

18 Claims, 11 Drawing Sheets

(51) Int. Cl.
*A47H 1/10* (2006.01)
*A47F 7/00* (2006.01)
*F16M 11/10* (2006.01)
*G06F 1/16* (2006.01)

(56) References Cited

U.S. PATENT DOCUMENTS

| | | | | |
|---|---|---|---|---|
| 3,353,684 | A * | 11/1967 | Chesley | A47B 57/42 108/106 |
| 4,516,751 | A | 5/1985 | Westbrook | |
| 4,671,481 | A * | 6/1987 | Beard | A47B 57/42 248/222.13 |
| 4,971,281 | A * | 11/1990 | Steinbeck | A47B 57/42 211/192 |
| 5,063,715 | A * | 11/1991 | Goodman | A47B 57/16 211/192 |
| 5,537,289 | A | 7/1996 | Dahl | |
| 5,697,662 | A * | 12/1997 | Leftwich | B60N 2/01583 248/503.1 |
| 5,941,228 | A * | 8/1999 | McKenzie | A47J 37/0786 126/25 R |
| 7,334,766 | B2 * | 2/2008 | Ligertwood | 248/292.13 |
| 7,722,002 | B2 * | 5/2010 | O'Keene et al. | 248/274.1 |
| 7,731,143 | B2 * | 6/2010 | Muday et al. | 248/284.1 |
| 7,878,473 | B1 * | 2/2011 | Oh | 248/339 |
| 8,235,341 | B2 * | 8/2012 | Taylor | 248/292.14 |
| 8,262,044 | B2 * | 9/2012 | Luijben et al. | 248/276.1 |
| 8,267,366 | B2 * | 9/2012 | Cheng | F16M 11/046 248/121 |
| 8,724,298 | B2 | 5/2014 | Delva et al. | |
| 2008/0029669 | A1 | 2/2008 | Olah et al. | |
| 2008/0237426 | A1 * | 10/2008 | Walters | F16M 11/10 248/316.8 |
| 2009/0052980 | A1 * | 2/2009 | Williams | E04G 7/307 403/33 |
| 2009/0057515 | A1 * | 3/2009 | Chuang | F16M 13/02 248/305 |
| 2009/0184221 | A1 * | 7/2009 | Sculler | 248/221.11 |
| 2011/0234926 | A1 * | 9/2011 | Smith | 348/836 |
| 2012/0091300 | A1 * | 4/2012 | Bee | A61G 5/1067 248/219.4 |
| 2012/0119043 | A1 * | 5/2012 | Rataiczak, III | A47B 96/061 248/218.4 |
| 2014/0021312 | A1 * | 1/2014 | Nguyen | F16M 11/10 248/205.1 |

* cited by examiner

US 9,897,250 B1

WALL MOUNT SYSTEM WITH BRACKETS COUPLED TO WALL PLATE TRACK BY ROTATABLE SECUREMENT DEVICE

BACKGROUND

Because of their reduced weight and size as compared to previous generations, a modern, digital television or monitor ("display") can be mounted to a flat surface, such as a wall. Conventional mounting systems often use a wall plate attached to the wall and one or more brackets attached to the display to secure the display to the wall. A typical wall plate often has one or more tracks shaped to couple to lips on the bracket. When placed in a proper position, the track/lip system supports the weight of the display, with the weight being transferred ultimately to the wall through the bracket.

In some conventional wall mounting systems for digital displays, additional securement of the display may be realized using one or more pins on the track of the wall plate and/or the lip of the bracket. In some conventional mounting systems, these pins are often placed in difficult to access positions, often in the center of the back of the display. In these systems, it may be difficult to install or remove the display, especially if there are physical impediments preventing installation or access, such as other displays, walls, and the like. In the case of other displays acting as physical impediments, it may be necessary to remove the other displays around a target display in order to access and remove the target display. This can be very inconvenient for an installer or repairperson needing to remove a single display.

It is with respect to these and other considerations that the various embodiments described below are presented.

SUMMARY

A wall mount system is disclosed herein. The wall mount system can include a wall plate and one or more brackets. The wall mount is configured to be removably affixed to a surface, such as a wall, and includes an upper track and a lower track. The wall mount system also includes one or more brackets configured to be coupled to the wall mount. Each bracket includes at least one lip configured to be removably coupled to the upper track of the wall mount.

The wall mount system also includes a securement device configured to be coupled to the brackets and the lower track, wherein the coupling of the securement device with the lower track acts to prevent a rotation of the bracket. The securement device includes a securement lip configured for rotatable coupling with a lower track lip of the lower track. The wall mount system further includes a lever coupled to the securement device and extending a length from the securement device along the bracket. The lever is configured to receive an upward force to decouple the securement device from the lower track lip.

According to another aspect disclosed herein, a bracket for securing a display to a surface is described. The bracket includes a securement device coupled to the bracket and configured for rotatable coupling with a lower track of a wall mount. The coupling of the securement device to the lower track acts to prevent the rotation of the bracket. The securement device includes a securement lip configured for rotatable coupling with a lower track lip of the lower track.

The bracket may further include a lever coupled to the securement device and extending a length from the securement device along the bracket. The lever is configured to receive an upward force to decouple the securement device from the lower track lip. In particular, in one embodiment the lever has one end rotatably coupled to the securement device and one end distal from the securement device. The distal end extends from the securement device to a position proximate to the bottom rear of a display. When manipulated in a direction toward the securement device, the lever rotates the securement device. The rotation of the securement device decouples the lip of the securement device from the bottom track of the wall plate, allowing the removal of the display.

These and various other features as well as advantages will be apparent from a reading of the following detailed description and a review of the associated drawings.

DETAILED DESCRIPTION

Figure 1:
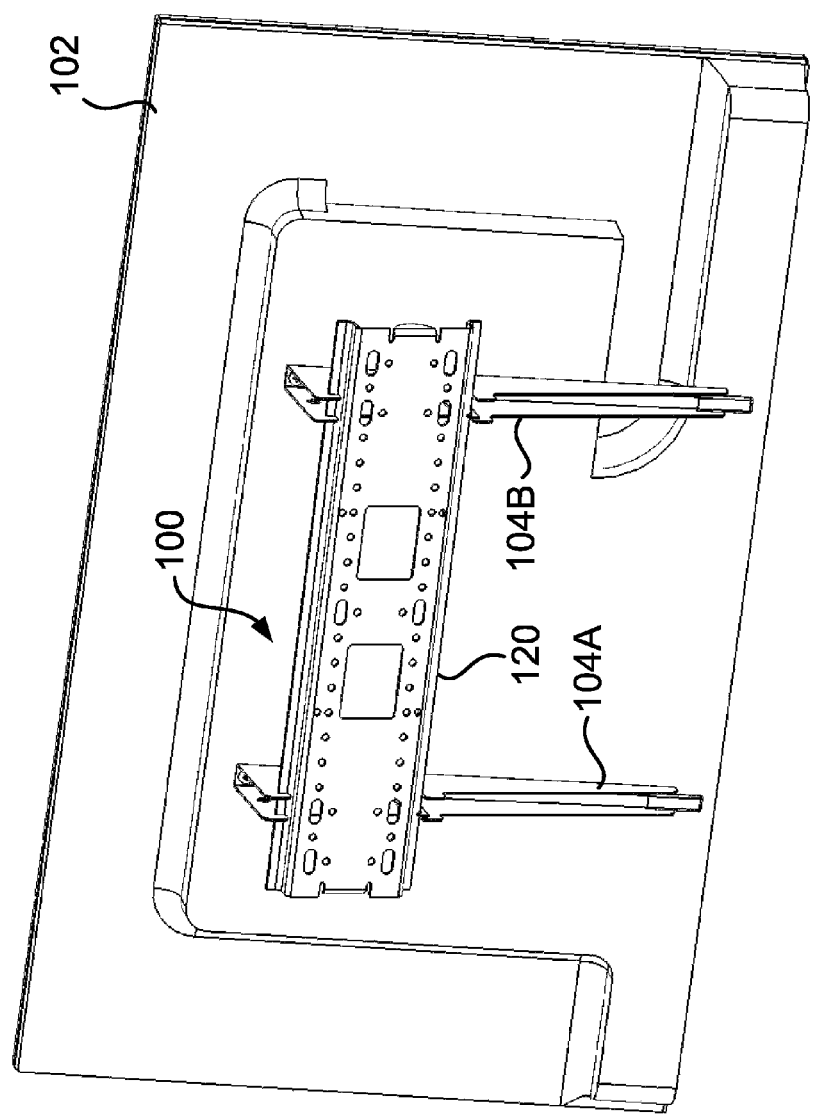
FIG. 1 a diagram showing a perspective view of a wall mount system affixed to a display according to at least one embodiment disclosed herein.

A wall mount system is disclosed herein for mounting certain types of devices, such as digital displays. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described. Unless otherwise specified, the illustrations and accompanying description are for descriptive purposes only and are not intended to limit the scope of the presently disclosed subject matter.

FIG. 1 a diagram showing a perspective view of a wall mount system 100 affixed to a display 102 according to at least one embodiment disclosed herein. It should be understood that, even though the display 102 in FIG. 1 is mounted in a landscape orientation, with longer sides of the display 102 comprising the top and bottom, and the shorter sides of the display 102 comprising the right and left sides, the display 102 may be mounted in other orientations as well. In the configuration illustrated in FIG. 1, the wall mount system 100 includes a first bracket 104A and a second bracket 104B. The first bracket 104A and the second bracket 104B are operative to be removably affixed to the display 102.

Various configurations described herein may use two brackets, such as the first bracket 104A and the second bracket 104B, but other configurations not explicitly described but considered to be within the scope of the presently disclosed subject matter may use fewer or more brackets 104. For example, some configurations may use three or more brackets 104. In another example, some configurations may only use one bracket 104. Therefore, it should be understood that the presently disclosed subject matter is not limited to any particular number of brackets 104 or other components described herein.

The first bracket 104A and the second bracket 104B are coupled to a wall mount 120. In some configurations, the wall mount 120 is removably affixed to a wall or other surface (not shown). When properly configured, the wall mount 120 receives the weight of the display 102 through the first bracket 104A and/or the second bracket 104B and transfers the weight to a wall or other surface to which the wall mount 120 is affixed. Additional details of how the various components of the wall mount system 100 interact are provided below.

Figure 2:
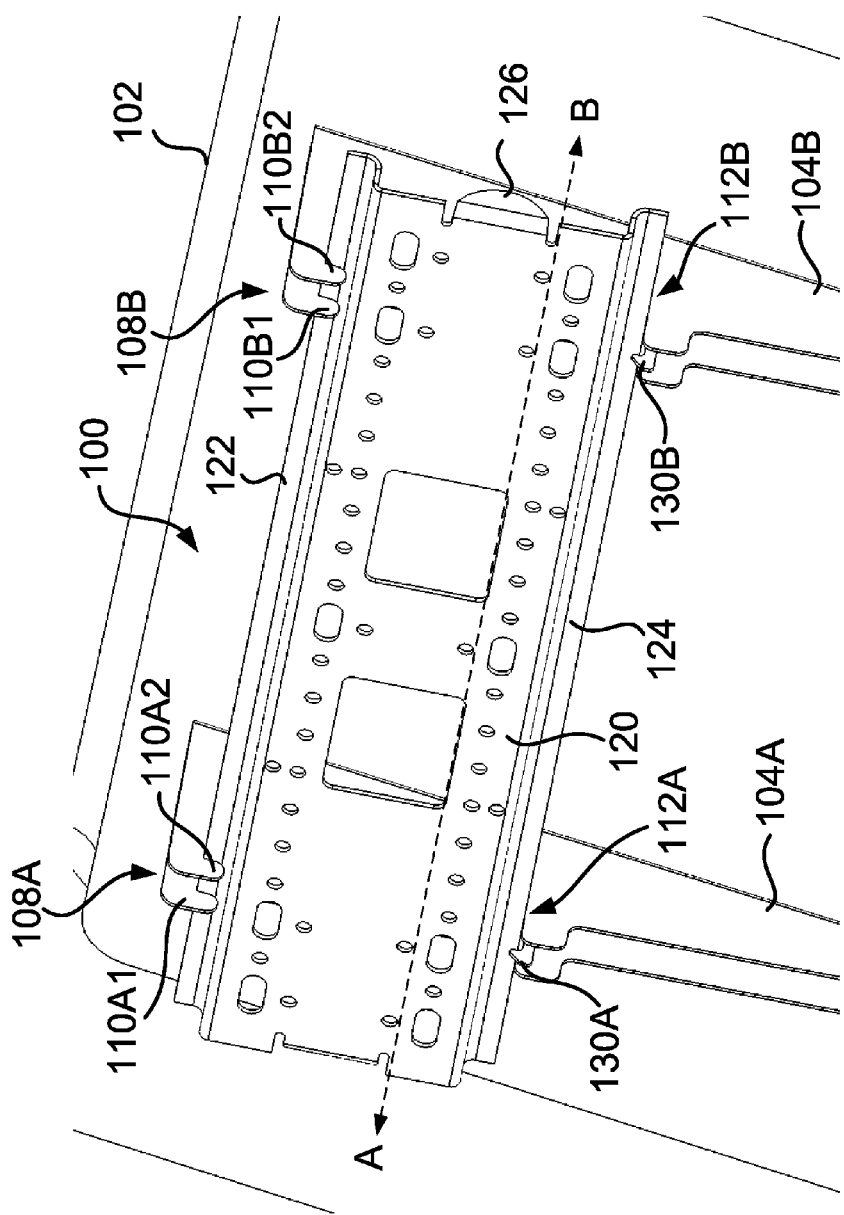
FIG. 2 is a diagram showing a perspective, close-up view of a wall mount system affixed to a display according to at least one embodiment disclosed herein.

FIG. 2 is a diagram showing a perspective, close-up view of the wall mount system 100 affixed to a display 102 according to at least one embodiment disclosed herein. The wall mount system 100 includes the first bracket 104A and the second bracket 104B. The first bracket 104A and the second bracket 104B are coupled to the wall mount 120. The wall mount 120 includes an upper track 122 and a lower track 124 for receiving the first bracket 104A and the second bracket 104B.

To couple the first bracket 104A and the second bracket 104B to the wall mount 120 upper track 122, the first bracket 104A includes a lip section 108A and the second bracket 104B includes a lip section 108B. The lip section 108A includes a lip 110A1 and a lip 110A2. In a similar manner, the lip section 108B includes lip 110B1 and a lip 110B2. The lips 110A1, 110A2, 110B1 and 110B2 of the first bracket 104A and the second bracket 104B, respectively, are coupled to the upper track 122 of the wall mount 120. In some configurations, when suitably positioned, the coupling of the lips 110A1, 110A2, 110B1 and 110B2 to the upper track 122 of the wall mount 120 supports most, if not all, of the weight of the display 102 in the direction of gravity.

To reduce the probability of the rotation of the display 102 when coupled to the wall mount 120, the lower track 124 of the wall mount 120 may be used in conjunction with the first bracket 104A and the second bracket 104B. The first bracket 104A may include a first bracket support 112A and a securement device 130A. The second bracket 104B may include a second bracket support 112B and a securement device 130B. The first bracket support 112A and the second bracket support 112B may be generally planar and configured to receive and support a portion of the weight of the display 102.

When the display 102 is coupled to the wall mount 120, one or more angular vectors may be imparted on the display 102 resulting in a moment of inertia in a direction away from the wall mount 120. If uncompensated for, the moment of inertia may cause the display 102, the first bracket 104A and the second bracket 104B to rotate away from the wall to which the wall mount 120 is affixed. This may be beneficial when installing or removing the display 102, as the rotation away from the first bracket support 112A and the second bracket support 112B may allow the removal or installation of the display 102. But, this rotation may result in the display 102 not being properly secured. To compensate for the moment of inertia, the securement device 130A and the securement device 130B couple to the lower track 124, removably coupling the first bracket 104A and the second bracket 104B to the lower track 124 of the wall mount 120.

To reduce the probability that the first bracket 104A or the second bracket 104B slides off the wall mount 120 in a direction along the line A-B, the wall mount 120 may also include a tab 126. The tab 126 may be configured to interact with a protrusion of the first bracket 104A or the second bracket 104B to prevent the lateral movement beyond the wall mount 120, described in more detail in FIG. 10, below.

Figure 3:
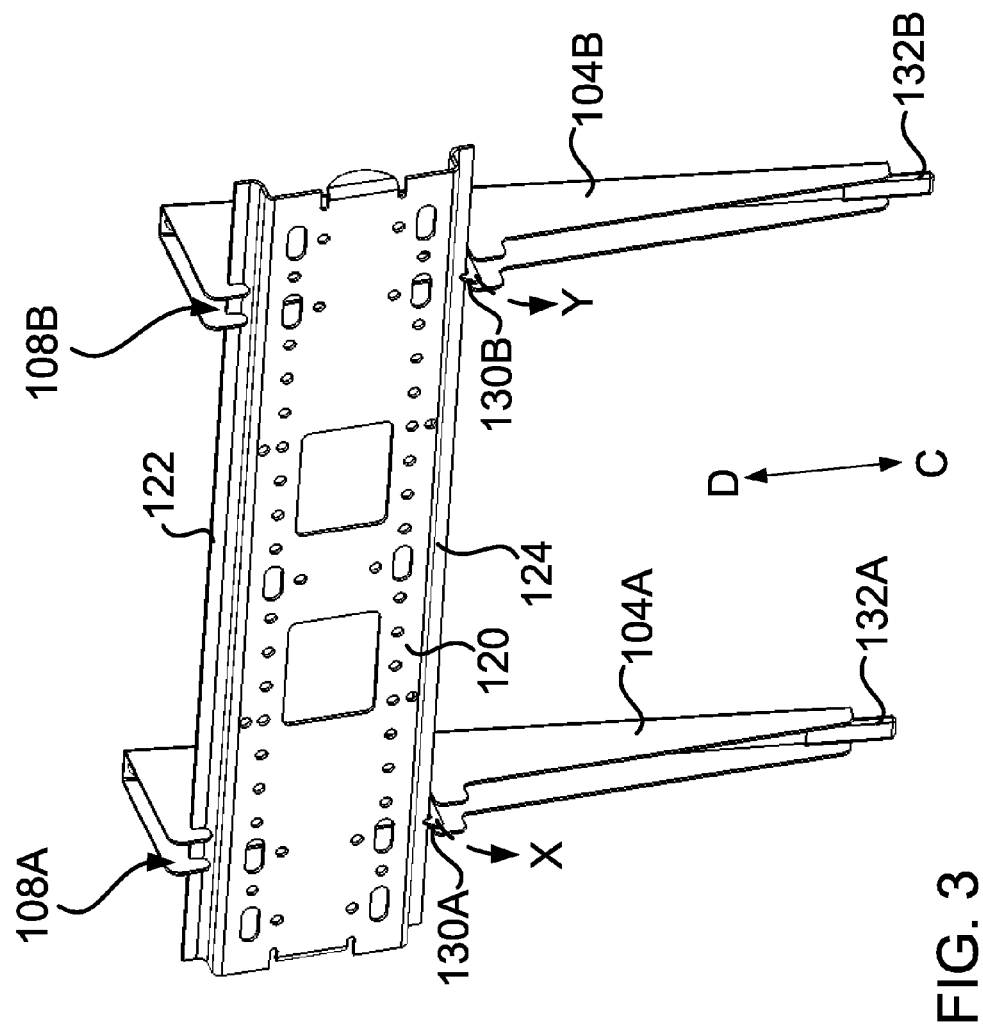
FIG. 3 is a diagram showing an additional perspective view of a wall mount system according to at least one embodiment disclosed herein.

FIG. 3 is a diagram showing an additional perspective view of the wall mount system 100 according to at least one embodiment disclosed herein. The wall mount system 100 includes the first bracket 104A and the second bracket 104B removably affixed to the wall mount 120. The lip section 108A and the lip section 108B are removably coupled to the upper track 122 of the wall mount 120. The securement device 130A and the securement device 130B are removably coupled to the lower track 124 of the wall mount 120.

As mentioned briefly above, it may be desirable or necessary to decouple the securement device 130A and the securement device 130B from the lower track 124 of the wall mount 120. For example, it may be necessary to remove the display 102 from the wall mount 120. To decouple the securement device 130A and the securement device 130B, a lever 132A and a lever 132B, respectively, are provided. When manipulated in a direction along the line C-D in a direction from C to D, the lever 132A causes the securement device 130A to rotate in a direction indicated by the arrow X.

In a similar manner, when manipulated in a direction along the line C-D in a direction from C to D, the lever 132B causes the securement device 130B to rotate in a direction indicated by the arrow Y. The rotation of the securement devices 130A and 103B in an appropriate amount decouples the securement devices 130A and 130B from the lower track 124 of the wall mount 120. This allows the rotation of the first bracket 104A and the second bracket 104B. When rotated in an appropriate amount, the display 102, the first bracket 104A and the second bracket 104B may be lifted, decoupling the lip section 108A and the lip section 108B from the upper track 122 of the wall mount 120, allowing the removal of the display 102, explained in more detail in FIG. 4, below.

Figure 4:
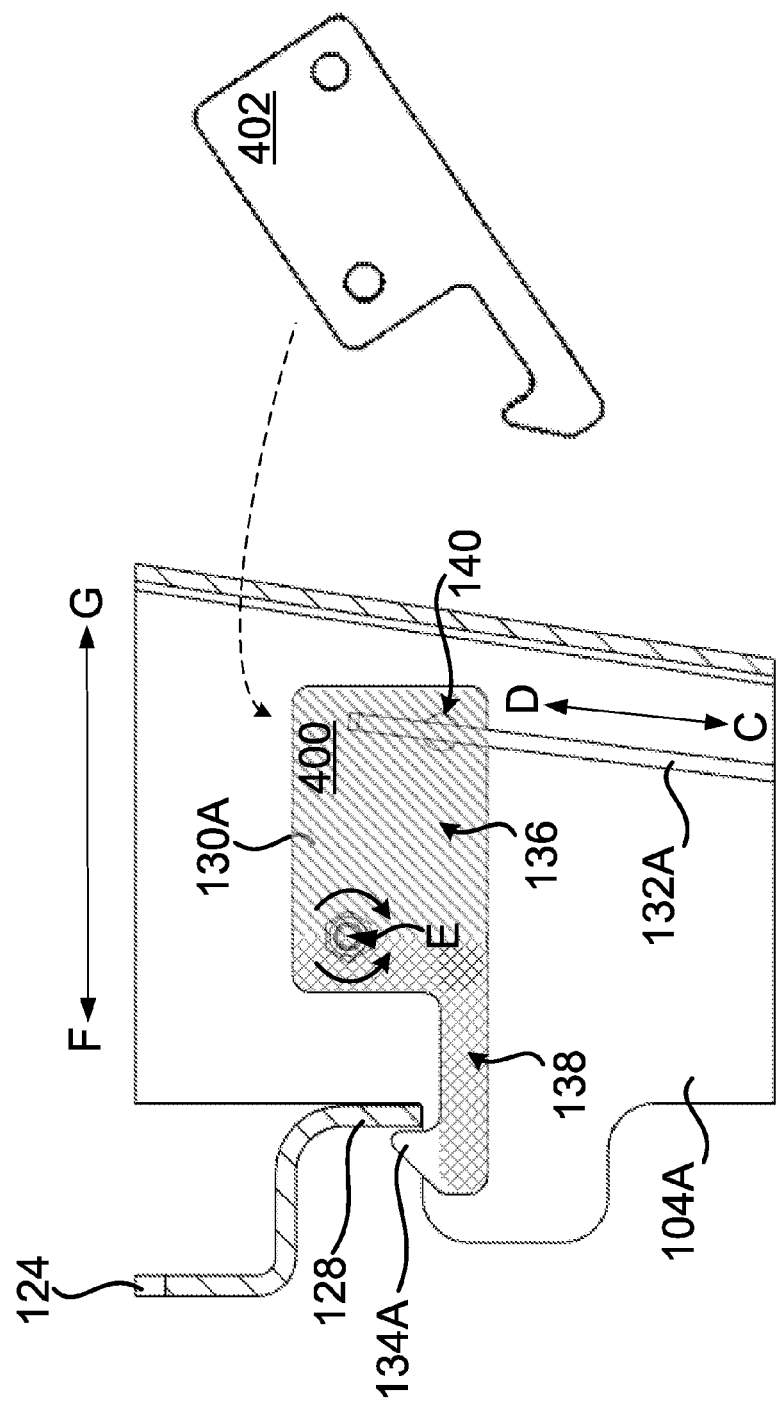
FIG. 4 is a diagram showing a side view of a securement device coupled to a lower track of a wall mount in a coupled configuration according to at least one embodiment disclosed herein.

FIG. 4 is a diagram showing a side view of the securement device 130A coupled to the lower track 124 of the wall mount 120 in a coupled configuration 400 according to at least one embodiment disclosed herein. The securement device 130A includes securement lip 134A which is rotatably couplable with a lower track lip 128. The securement device 130A rotates around axis E. When coupled, the securement lip 134A and the lower track lip 128 act to reduce the ability of the first bracket 104A to travel in a direction along the line F-G from point F to point G. When decoupled, the ability of the securement lip 134A to move in a direction along the line F-G from point F to point G is no longer impeded by the lower track lip 128, thus allowing the first bracket 104A to travel in a direction along the line F-G from point F to point G.

As mentioned above, the lever 132A is operative to manipulate the securement device 130A to facilitate the coupling and decoupling of the securement device 130A to the lower track 124 of the wall mount 120. The securement device 130A is rotatably secured to the first bracket 104A at axis E. The rotatable securement allows the securement device 130A to rotate around axis E. When moved in a direction along the line C-D from point C to point D, the lever 132A imparts a force vector in the direction of point D, rotating the securement device 130A around the axis E in a counterclockwise direction (when viewed in the perspective of FIG. 4).

The rotation of the securement device 130A in counterclockwise direction around the axis E causes the securement lip 134A to move in a direction along the line C-D from point D to point C. When moved an appropriate amount, the securement lip 134A fully decouples from the lower track lip 128, shown as decoupled configuration 402. In the decoupled configuration, the first bracket 104A is moveable in a direction along the line F-G from point F to point G.

The securement device 130A and the lever 132A may be configured to have as a default, or naturally resting, position the coupled configuration 400. In this example, the amount of mass in section 136 of the securement device 130A, identified as a hashed pattern, is greater than the mass in section 138, identified as a cross hatched pattern. The greater mass of the section 136 creates a larger force vector than the mass of the section 138, resulting in a counterclockwise force imparted on the securement device 130A from the mass of the securement device 130A itself.

With no other outside forces imparted on the securement device 130A, the counterclockwise force created by the mass difference between the section 136 and the section 138 acts to impart a continual force on the securement lip 134A along the line C-D in a direction from point C to point D, naturally securing the securement device 130A to the lower track 124 of the wall mount 120. The mass of the lever 132A, when coupled to the securement device 130A at location 140, adds to the mass of the section 136, providing additional securement force.

Figure 5:
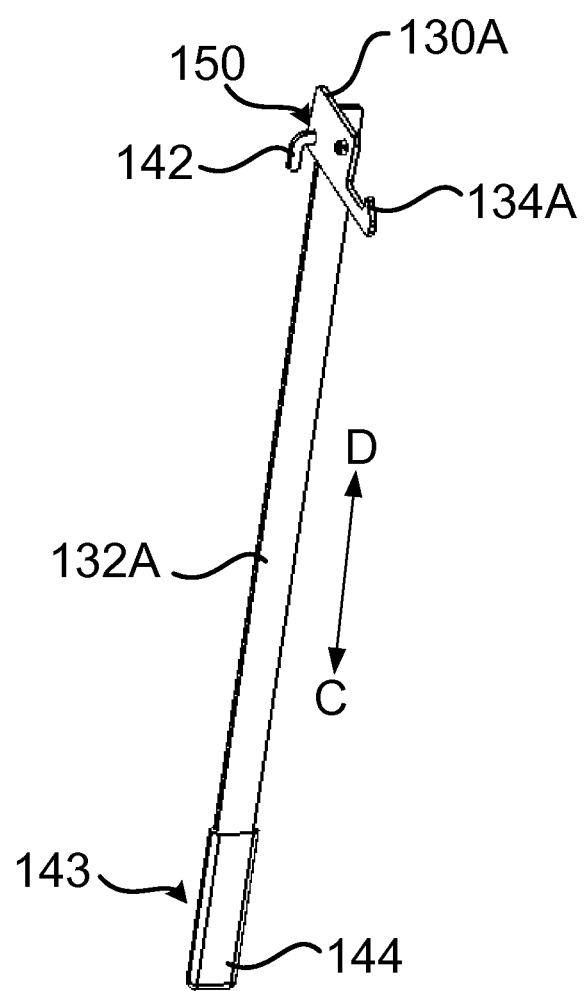
FIG. 5 is a diagram showing a side, perspective view of a lever coupled to the securement device according to at least one embodiment disclosed herein.

FIG. 5 is a diagram showing a side, perspective view of the lever 132A coupled to the securement device 130A according to at least one embodiment disclosed herein. The lever 132A includes an operation end 143. In some configurations, the operation end 143 is operative to receive a force along the line C-D from point C to point D to decouple the securement lip 134A from the wall mount 120. In further configurations, the operation end 143 includes a sleeve 144. The sleeve 144 may be a material configured as a buffer between the lever 132A, which is constructed of relatively hard material, such as metal, in some configurations, and other objects such as the display 102 or a hand.

To secure the lever 132A to the securement device 130A, the lever 132A includes coupler 142. The coupler 142 is removably couplable with the securement device 130A through the aperture 150. The coupler 142 may be inserted through or removed from the aperture 150 to couple or decouple the lever 132A from the securement device 130A, respectively, described in more detail in FIG. 7, below.

Figure 6A:
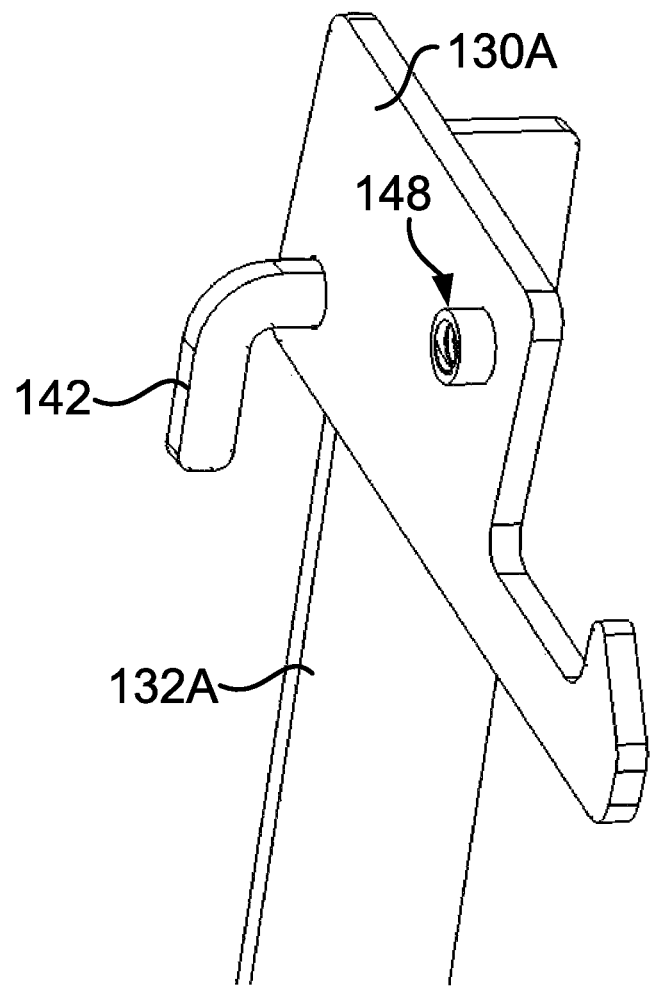
FIGS. 6A-6C are diagrams showing various views of a lever coupled to a securement device according to at least one embodiment disclosed herein.
Figure 6C:
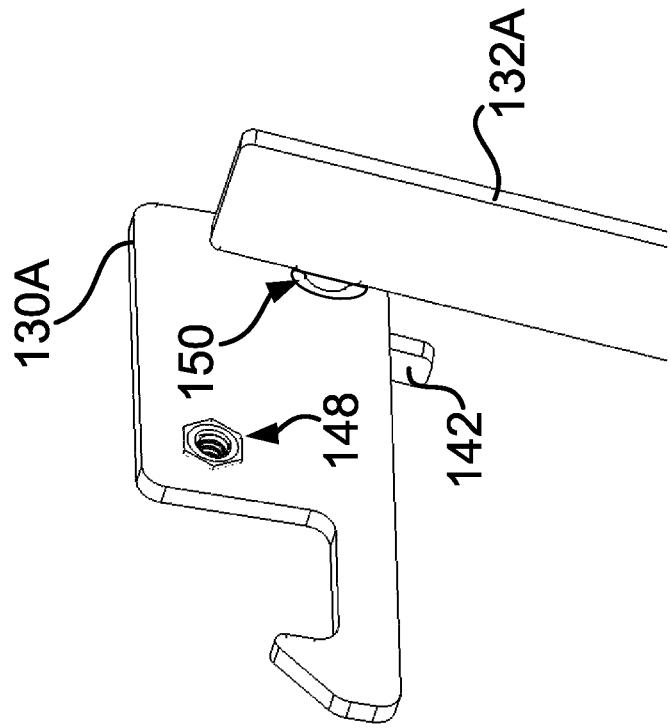
Figure 6B:
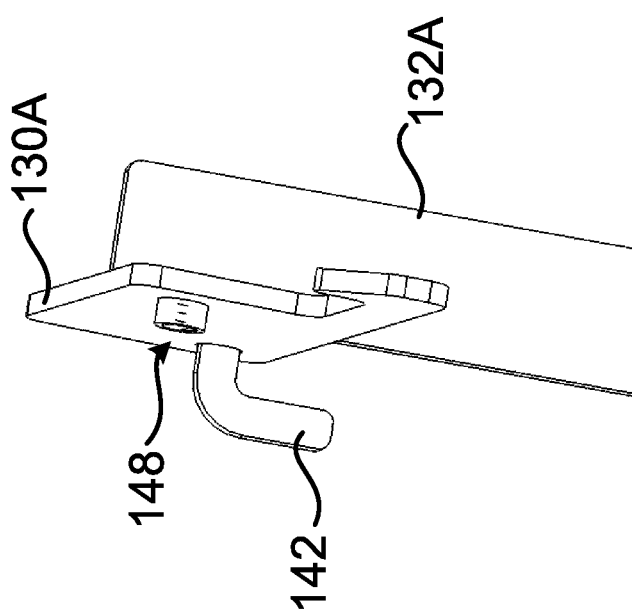

FIGS. 6A-6C are diagrams showing various views of the lever 132A coupled to the securement device 130A according to at least one embodiment disclosed herein. FIG. 6A shows the securement device 130A coupled to the lever 132A by the coupler 142. Also shown is securement aperture 148. The securement aperture 148 is configured to receive a securement member to removably affix the securement device 130A to the first bracket 104A.

When affixed to the first bracket 104A, the securement device 130A rotates around the securement aperture 148, described by way of example in FIG. 4, above, in regard to axis E. Various aspects of a securement member are described in further detail in FIG. 8, below. FIG. 6B shows the securement device 130A coupled to the lever 132A by the coupler 142. Also shown is securement aperture 148.

FIG. 6C shows the securement device 130A coupled to the lever 132A by the coupler 142. The coupler 142 is removably inserted through the securement device 130A through the aperture 150. As mentioned above, the securement device 130A is removably affixed to the first bracket 104A using a securement member and the securement aperture 148. In FIG. 6C, the securement aperture 148 is configured with threads lining the inner wall of the securement aperture 148 operative to receive a threaded member. The threaded member may be screwed into the securement aperture 148 and cooperatively received in an aperture located on the first bracket 104A, described in more detail in FIG. 8, below.

Figure 7:
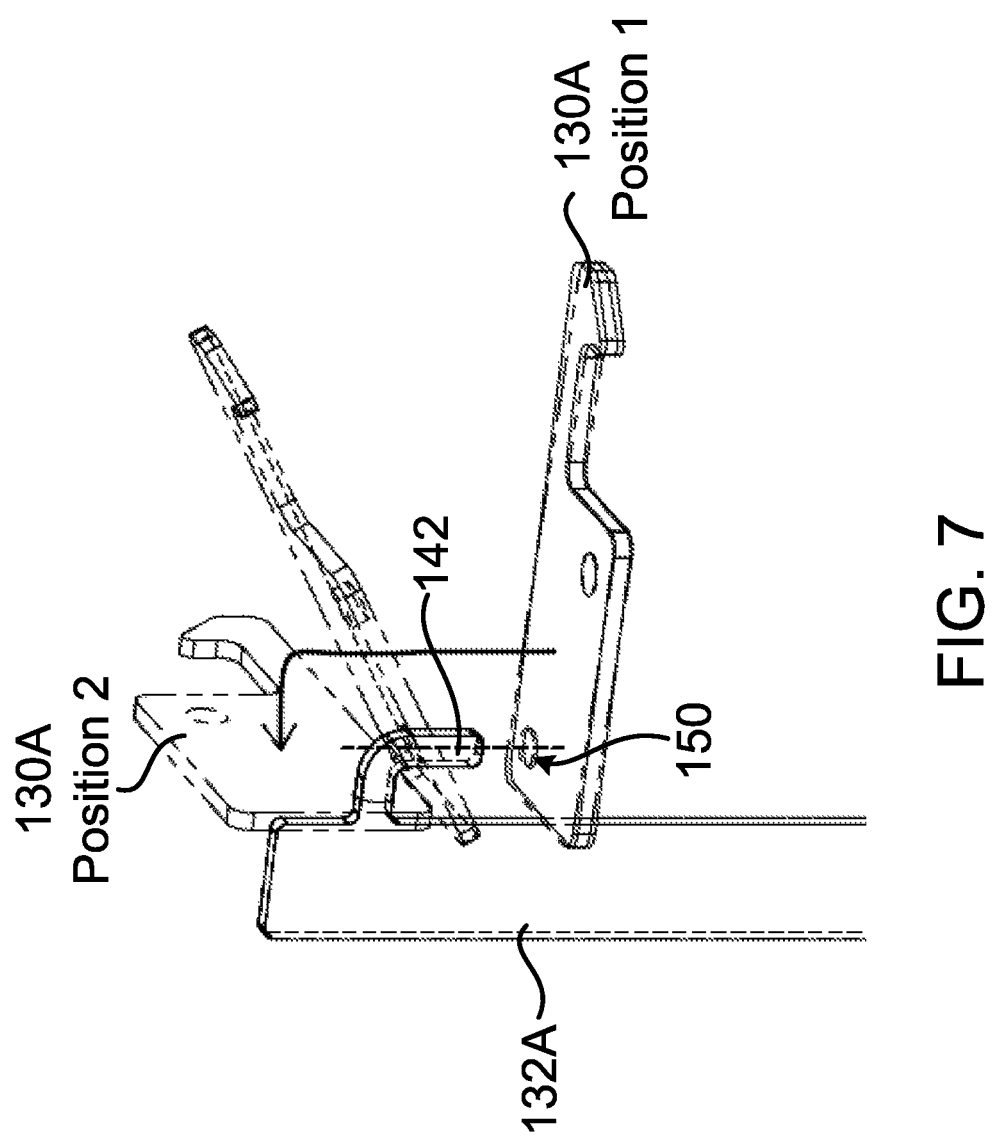
FIG. 7 is a diagram showing a coupling and decoupling operation of a securement device onto and from a lever according to at least one embodiment disclosed herein.

FIG. 7 is a diagram showing a coupling and decoupling operation of the securement device 130A onto and from the lever 132A according to at least one embodiment disclosed herein. To couple the securement device 130A to the lever 132A, the end of the coupler distal from the lever 132A is inserted into the aperture 150 and rotated from the securement device 130A position 1 to the securement device position 2. To decouple the securement device 103A from the lever 132A, the end of the coupler distal from the lever 132A is rotated from the securement device 130A position 2 to the securement device position 1 and removed from the aperture 150.

Figure 8:
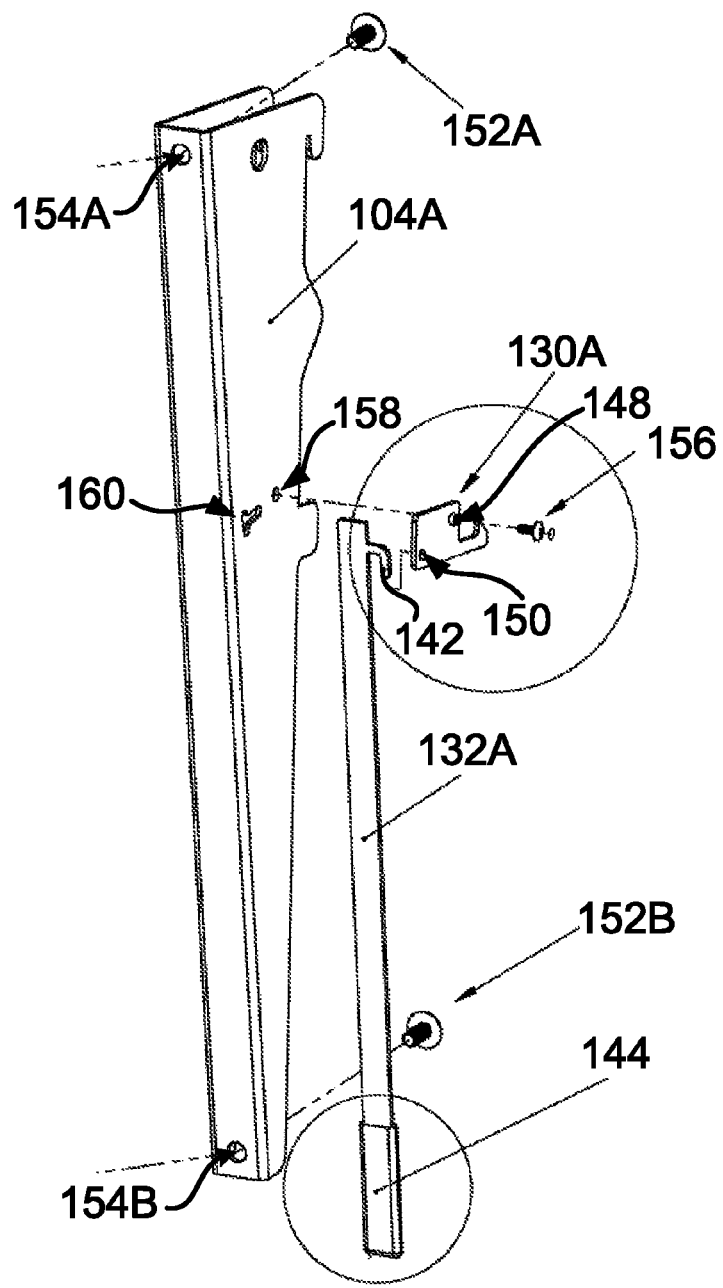
FIG. 8 is a diagram showing a perspective, exploded view of a first bracket and securement mechanisms according to at least one embodiment disclosed herein.

FIG. 8 is a diagram showing a perspective, exploded view of the first bracket 104A and securement mechanisms according to at least one embodiment disclosed herein. Shown in FIG. 8 are the securement device 130A and the lever 132A. The lever 132A is shown with the sleeve 144. The lever 132A is coupled to the securement device 130A using the coupler 142. The first bracket 104A is affixed to the display using the bracket securement member 152A through aperture 154A and the bracket securement member 152B through the aperture 154B, described in more detail in FIG. 10, below.

The securement device 130A is removably, rotatably affixed to the first bracket 104A using securement member 156 through securement aperture 148, the securement member 156 received in a receiving aperture 158 of the first bracket 104A. The lever 132A may be configured for coupling with the first bracket 104A through aperture 160, described in more detail in FIG. 9, below.

Figure 9:
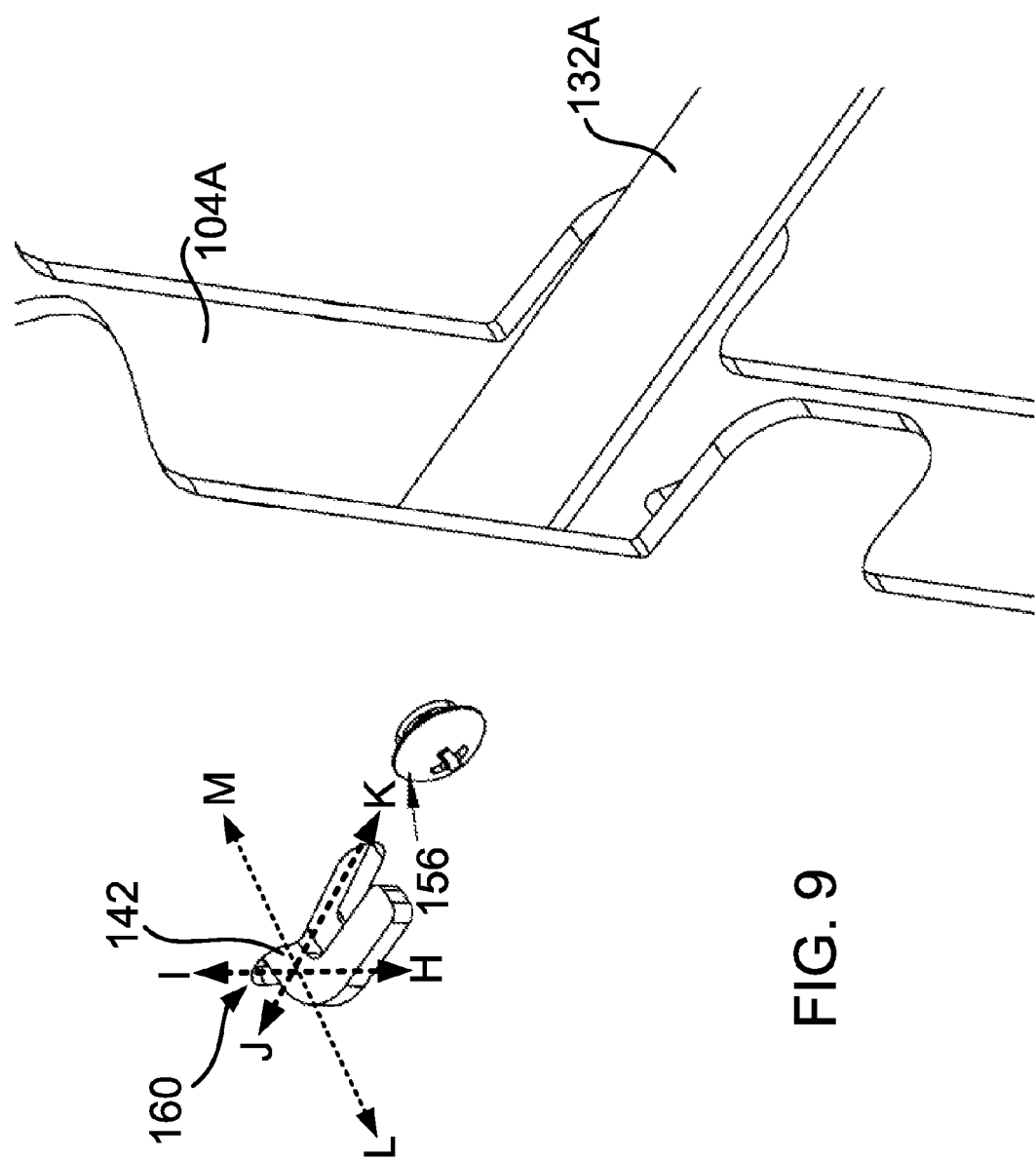
FIG. 9 is a diagram showing a perspective view of a first bracket and a lever showing aspects of coupling and decoupling a lever to and from the first bracket according to at least one embodiment disclosed herein.

FIG. 9 is a diagram showing a perspective view of the first bracket 104A and the lever 132A showing aspects of coupling and decoupling the lever 132A to and from the first bracket 104A according to at least one embodiment disclosed herein. To insert or remove the coupler 142 to or from the aperture 160 of the first bracket 104A, the lever 132A is positioned so that so that the end of the coupler 142 extends in a direction parallel to the line J-K. The lever 132A may then be removed by moving the lever 132A in the direction along the line L-M from the point L to the point M.

As illustrated, the aperture 160 is sized to allow the coupler 142 to move through the aperture 160 when placed in this orientation. During normal operation, the lever 132A is positioned so that the coupler 142 extends in a direction parallel to the line H-I. The aperture 160 is configured so that when the coupler is oriented in a direction defined by the direction parallel to the line H-I, the aperture 160 is sized to abate the movement of the coupler 142 through the aperture 160.

Also illustrated is the securement member 156, which provides additional securement of the securement device 130A to the first bracket 104A. In some configurations, the securement member 156 and cooperative receiving threads in the receiving aperture 158, shown in FIG. 8, are configured so that over-tightening of the securement member 156 does not appreciably affect the ability of the securement device 130A to rotate about the axis E.

Figure 10:
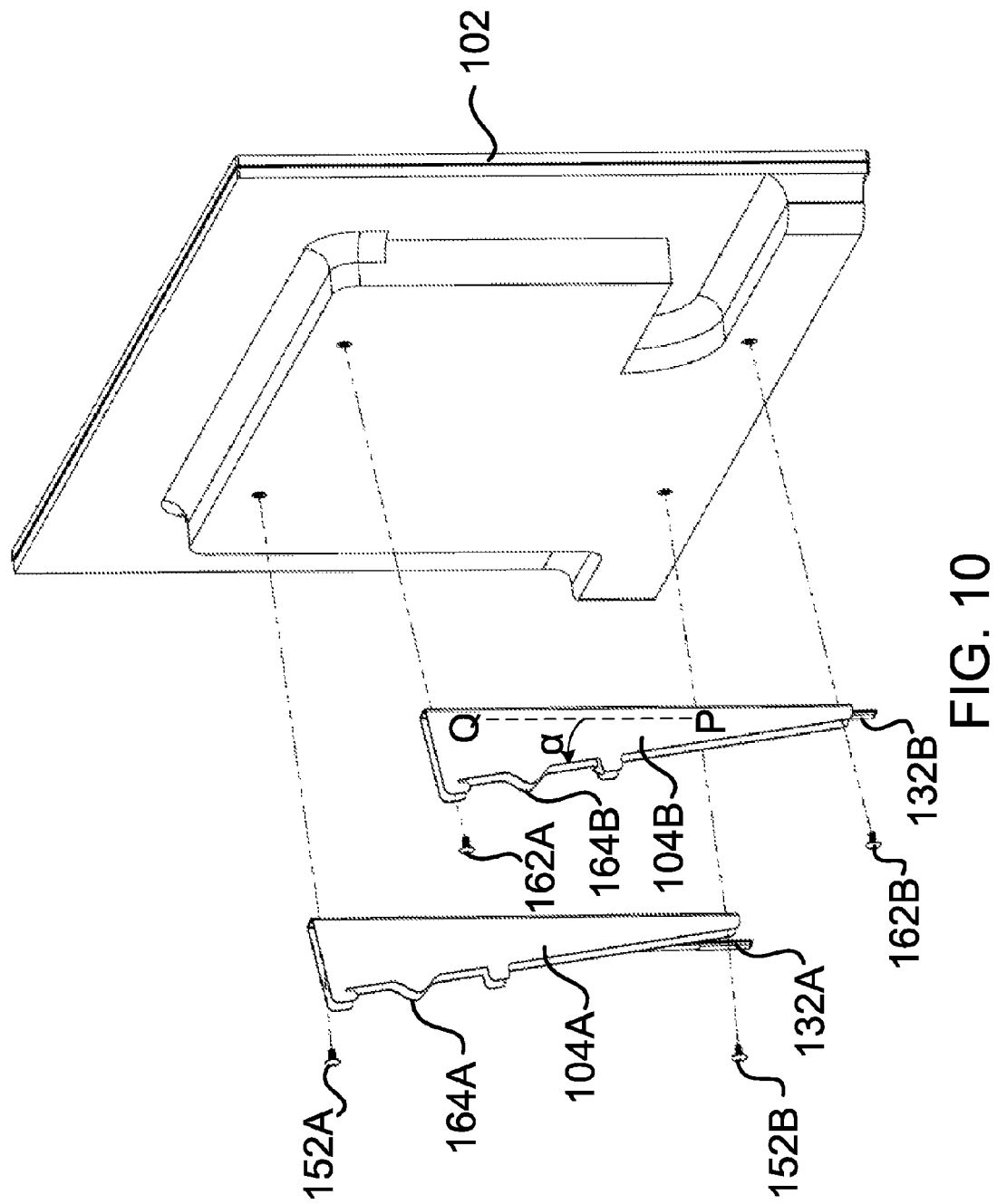
FIG. 10 is a diagram showing one configuration for affixing a first bracket and a second bracket to a display according to at least one embodiment disclosed herein.

FIG. 10 is a diagram showing one configuration for affixing the first bracket 104A and the second bracket 104B to the display 102 according to at least one embodiment disclosed herein. The first bracket 104A is affixed to a first location of the display 102 using the bracket securement member 152A and a second location of the display 102 using the bracket securement member 152B. The second bracket 104B is affixed to the display 102 using a bracket securement member 162A and a bracket securement member 162B.

In one configuration briefly mentioned in FIG. 2, to reduce the probability that the first bracket 104A or the second bracket 104B slides off the wall mount 120 in a direction along the line A-B, the wall mount 120 may also include a tab 126. The tab 126 may be configured to interact with a protrusion of the first bracket 104A or the second bracket 104B to prevent the lateral movement beyond the wall mount 120. As illustrated in FIG. 10, the first bracket 104A includes a protrusion 164A and the second bracket 104B includes a protrusion 164B. When moved an appropriate distance along the line A-B, the first protrusion 164A or the second protrusion 164B are configured to abut the tab 126 of the wall mount 120, preventing further lateral movement.

It may be desirable in some configurations to provide a viewing angle for the display 102 when the display 102 installed on the wall mount 120. In one example, the display 102 may be placed at a height that is above the height of an average viewer. If the display 102 is installed so that the display is essentially parallel to the surface upon which the display 102 is mounted, a viewer may not be able to readily see information displayed on the display 102, or viewing the display may be uncomfortable. In configurations in which an angled viewing experience is desired or needed, the first bracket 104A and the second bracket 104B may have an angular displacement a measured from a line P-Q, which is parallel to the edge of the first bracket 104A or the second bracket 104B proximate to the display. When installed on the wall mount 120, the angular displacement a provides for an angled viewing experience.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A wall mount system, comprising:
    a wall mount configured to be removably affixed to a surface, the wall mount comprising an upper track and a lower track;
    a bracket configured to be coupled to the wall mount, the bracket comprising at least one lip configured to be removably coupled to the upper track of the wall mount and a protrusion configured to abut a tab of the wall mount to impede lateral movement of the bracket;
    a securement device rotatably mounted to the bracket at a rotational axis and configured to be coupled to the lower track, wherein the coupling of the securement device with the lower track acts to prevent a rotation of the bracket, the securement device comprising a securement lip configured for rotatable coupling with a lower track lip of the lower track, wherein the securement device comprises a first section having a first mass greater than a second mass of a second section to rotatably bias the securement device to secure the securement lip to the lower track lip in a naturally resting position; and
    a lever coupled to the securement device and extending a length from the securement device along the bracket, wherein the lever is configured to receive an upward force to decouple the securement device from the lower track lip by rotating the securement device around the rotational axis in a position different from the naturally resting position.

2. The wall mount system of claim 1, wherein the lever is coupled to the securement device at the first section to increase counter the rotational bias configured to secure the securement lip to the lower track lip in a naturally resting position.

3. The wall mount system of claim 1, wherein a coupler is operative to couple the lever to the securement device.

4. The wall mount system of claim 3, wherein the securement device is operative to receive the coupler through an aperture in the securement device.

5. The wall mount of claim 4, wherein the aperture in the securement device is operative to receive the coupler in a first position of the lever.

6. The wall mount system of claim 5, wherein the aperture in the securement device is operative to prevent the removal of the coupler in a second position of the lever.

7. The wall mount system of claim 1, wherein the securement device is configured to be removably affixed to the bracket with a securement member through an aperture in the securement device and into a receiving aperture in the bracket.

8. The wall mount system of claim 7, wherein the securement member and the receiving aperture in the bracket are configured so that over-tightening of the securement member does not affect the ability of the securement device to rotate about the rotational axis.

9. A bracket for securing a display to a surface, comprising:
    a securement device rotatably mounted to the bracket at a rotational axis and configured to be coupled with a lower track of a wall mount, wherein the coupling of the securement device to the lower track acts to prevent the rotation of the bracket, the securement device comprising a securement lip configured for rotatable coupling with a lower track lip of the lower track, wherein the securement device comprises a first section having a first mass greater than a second mass of a second section to rotatably bias the securement device to secure the securement lip to the lower track lip in a naturally resting position; and
    a lever coupled to the securement device and extending a length from the securement device along the bracket, wherein the lever is configured to receive an upward force to decouple the securement device from the lower track lip by rotating the securement device around the rotational axis in a position different from the naturally resting position; and a protrusion configured to abut a tab of the wall mount to impede lateral movement of the bracket.

10. The bracket of claim 9, wherein the lever is coupled to the securement device at the first section to counter the rotational bias configured to secure the securement lip to the lower track lip in a naturally resting position.

11. The bracket of claim 9, wherein a coupler is operative to couple the lever to the securement device.

12. The bracket of claim 11, wherein the securement device is operative to receive the coupler through an aperture in the securement device.

13. The bracket of claim 12, wherein the aperture in the securement device is operative to receive the coupler in a first position of the lever.

14. The bracket of claim 12, wherein the aperture in the securement device is operative to prevent the removal of the coupler in a second position of the lever.

15. The bracket of claim 9, wherein the securement device is configured to be removably affixed to the bracket with a securement member through an aperture in the securement device and into a receiving aperture in the bracket.

16. The bracket of claim 15, wherein the securement member and the receiving aperture in the bracket are configured so that over-tightening of the securement member does not affect the ability of the securement device to rotate about the rotatable axis.

17. A wall mount system, comprising:
a wall mount configured to be removably affixed to a surface, the wall mount comprising an upper track and a lower track;
a bracket configured to be coupled to the wall mount, the bracket comprising at least one lip configured to be removably coupled to the upper track of the wall mount;
a securement device rotatably mounted to the bracket at a rotational axis and configured to be coupled to the lower track, wherein the coupling of the securement device with the lower track acts to prevent a rotation of the bracket, the securement device comprising a securement lip configured for rotatable coupling with a lower track lip of the lower track, wherein the securement device comprises a first section having a first mass greater than a second mass of a second section to rotatably bias the securement device to secure the securement lip to the lower track lip in a naturally resting position; and
a lever coupled to the securement device and extending a length from the securement device along the bracket, wherein the lever is configured to receive an upward force to decouple the securement device from the lower track lip by rotating the securement device around the rotational axis in a position different from the naturally resting position wherein the bracket further comprises a first aperture for receiving a bracket securement member to secure the bracket to a first location of a display and a second aperture for receiving a second bracket securement member to secure the bracket to a second location of the display.

18. A bracket for securing a display to a surface, comprising:
a securement device rotatably mounted to the bracket at a rotational axis and configured to be coupled with a lower track of a wall mount, wherein the coupling of the securement device to the lower track acts to prevent the rotation of the bracket, the securement device comprising a securement lip configured for rotatable coupling with a lower track lip of the lower track, wherein the securement device comprises a first section having a first mass greater than a second mass of a second section to rotatably bias the securement device to secure the securement lip to the lower track lip in a naturally resting position;
a lever coupled to the securement device and extending a length from the securement device along the bracket, wherein the lever is configured to receive an upward force to decouple the securement device from the lower track lip by rotating the securement device around the rotational axis in a position different from the naturally resting position; and
a first aperture for receiving a bracket securement member to secure the bracket to a first location of a display and a second aperture for receiving a second bracket securement member to secure the bracket to a second location of the display.

* * * * *